(12) United States Patent
Alahyari et al.

(10) Patent No.: US 12,366,209 B2
(45) Date of Patent: Jul. 22, 2025

(54) AIRCRAFT POWERPLANT WITH ELECTRIC POWERTRAIN

(71) Applicant: RTX Corporation, Farmington, CT (US)

(72) Inventors: Abbas A. Alahyari, Glastonbury, CT (US); Parag M. Kshirsagar, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/233,120

(22) Filed: Aug. 11, 2023

(65) Prior Publication Data

US 2025/0052201 A1 Feb. 13, 2025

(51) Int. Cl.
*F02C 7/32* (2006.01)

(52) U.S. Cl.
CPC .......... *F02C 7/32* (2013.01); *F05D 2220/323* (2013.01); *F05D 2220/76* (2013.01)

(58) Field of Classification Search
CPC ...... F02C 7/32; F02C 7/36; F02C 3/10; F02K 3/06; F02K 3/077
See application file for complete search history.

(56) References Cited

U.S. PATENT DOCUMENTS

| | | | |
|---|---|---|---|
| 9,828,911 B2 | 11/2017 | Burghardt | |
| 10,024,235 B2 | 7/2018 | Suciu | |
| 10,094,281 B2 | 10/2018 | Chandler | |
| 10,415,466 B2 | 9/2019 | Suciu | |
| 10,641,124 B2 | 5/2020 | Chandler | |
| 10,814,989 B2 | 10/2020 | Vessot | |
| 11,506,146 B2 | 11/2022 | Kupratis | |
| 11,519,289 B2 | 12/2022 | Suciu | |
| 11,879,413 B2 * | 1/2024 | Davies | .......... F01D 9/065 |

(Continued)

FOREIGN PATENT DOCUMENTS

| | | |
|---|---|---|
| CN | 108252807 B | 12/2019 |
| CN | 114198202 B | 4/2023 |
| FR | 3039206 B1 | 7/2017 |

OTHER PUBLICATIONS

Bowman et al., "Turbo- and Hybrid-Electrified Aircraft Propulsion Concepts for Commercial Transport", 2018 https://ntrs.nasa.gov/api/citations/20180005437/downloads/20180005437.pdf.

(Continued)

*Primary Examiner* — Thuyhang N Nguyen
(74) *Attorney, Agent, or Firm* — Getz Balich LLC (57) ABSTRACT

A powerplant is provided for an aircraft. This powerplant includes an engine housing, an engine assembly, an electric generator, an electric motor and a propulsor rotor. The engine assembly is arranged in the engine housing. The engine assembly includes a core flowpath, a core compressor section, a core combustor section, a core turbine section and a power turbine section. The power turbine section includes a power turbine rotor. The electric generator is arranged in the engine housing. The electric generator includes a generator rotor. The power turbine rotor is configured to drive rotation of the generator rotor. The electric motor is arranged in the engine housing. The electric motor includes a motor rotor. The electric generator is configured to power operation of the electric motor. The motor rotor is configured to drive rotation of the propulsor rotor.

17 Claims, 3 Drawing Sheets

(56) References Cited

U.S. PATENT DOCUMENTS

| | | | |
|---|---|---|---|
| 2004/0255590 A1* | 12/2004 | Rago | F02C 7/36 |
| | | | 60/793 |
| 2008/0184906 A1* | 8/2008 | Kejha | B64D 27/02 |
| | | | 102/374 |
| 2019/0145273 A1* | 5/2019 | Frank | F01D 15/10 |
| | | | 244/53 R |
| 2019/0368370 A1* | 12/2019 | Chandler | F02K 3/06 |
| 2020/0025071 A1* | 1/2020 | Suciu | F02C 3/10 |
| 2021/0231081 A1* | 7/2021 | Kupratis | F02C 3/10 |
| 2021/0339880 A1 | 11/2021 | Kupratis et al. | |
| 2022/0042461 A1* | 2/2022 | Molesini | F02C 7/36 |
| 2023/0121431 A1 | 4/2023 | O'Neill et al. | |

OTHER PUBLICATIONS

EP Search Report for EP Patent Application No. 24193953.7 dated Jan. 22, 2025.

* cited by examiner

AIRCRAFT POWERPLANT WITH ELECTRIC POWERTRAIN

BACKGROUND OF THE DISCLOSURE

1. Technical Field

This disclosure relates generally to an aircraft and, more particularly, to a propulsion system for the aircraft.

2. Background Information

Various types and configurations of propulsion systems are known in the art for an aircraft. While these known propulsion systems have various benefits, there is still room in the art for improvement.

SUMMARY OF THE DISCLOSURE

According to an aspect of the present disclosure, a powerplant is provided for an aircraft. This powerplant includes an engine housing, an engine assembly, an electric generator, an electric motor and a propulsor rotor. The engine assembly is arranged in the engine housing. The engine assembly includes a core flowpath, a core compressor section, a core combustor section, a core turbine section and a power turbine section. The core flowpath extends through the core compressor section, the core combustor section, the core turbine section and the power turbine section from an inlet into the core flowpath to an exhaust from the core flowpath. The power turbine section includes a power turbine rotor. The electric generator is arranged in the engine housing. The electric generator includes a generator rotor. The power turbine rotor is configured to drive rotation of the generator rotor. The electric motor is arranged in the engine housing. The electric motor includes a motor rotor. The electric generator is configured to power operation of the electric motor. The motor rotor is configured to drive rotation of the propulsor rotor.

According to another aspect of the present disclosure, another powerplant is provided for an aircraft. This powerplant includes an engine core, a power turbine section, a core flowpath, an electric generator, an electric motor and a propulsor rotor. The engine core includes a core compressor section, a core combustor section and a core turbine section. The power turbine section includes a power turbine rotor. The core flowpath extends through the core compressor section, the core combustor section, the core turbine section and the power turbine section from an inlet into the core flowpath to an exhaust from the core flowpath. The electric generator includes a generator rotor. The generator rotor is mechanically coupled to the power turbine rotor. The electric motor is electrically coupled to the electric generator. The electric motor includes a motor rotor. The engine core axially overlaps the electric generator and the electric motor. The propulsor rotor is rotatable about an axis and mechanically coupled to the motor rotor.

According to still another aspect of the present disclosure, another powerplant is provided for an aircraft. This powerplant includes an engine core, a power turbine section, a core flowpath, an electric generator, an electric motor and a propulsor rotor. The engine core includes a core compressor section, a core combustor section and a core turbine section. The power turbine section includes a power turbine rotor. The core flowpath extends through the core compressor section, the core combustor section, the core turbine section and the power turbine section from an inlet into the core flowpath to an exhaust from the core flowpath. The electric generator includes a generator rotor. The generator rotor is mechanically coupled to the power turbine rotor. The electric motor is located next to and electrically coupled with the electric generator. The electric motor includes a motor rotor. The propulsor rotor is rotatable about an axis and mechanically coupled to the motor rotor.

The engine housing may be configured as or otherwise include a nacelle. The nacelle may house the engine assembly, the electric generator and the electric motor.

The nacelle may also house the propulsor rotor.

The propulsor rotor may be rotationally mechanically independent of the power turbine rotor.

The powerplant may also include a geartrain arranged between and operatively coupling the power turbine rotor to the generator rotor.

The powerplant may also include a geartrain arranged between and operatively coupling the propulsor rotor to the motor rotor.

The motor rotor may be coaxial with the generator rotor.

The propulsor rotor may be rotatable about an axis. The electric motor may be axially adjacent the electric generator along the axis.

The electric generator may be configured as a superconducting electric generator. The electric motor may also or alternatively be configured as a superconducting electric motor.

The propulsor rotor may be rotatable about an axis. The engine assembly may include an engine core located to a side of and axially overlapping the electric generator and/or the electric motor. The engine core may include the core compressor section, the core combustor section and the core turbine section.

The powerplant may also include a second flowpath within the engine housing. The second flowpath may be disposed radially between the engine core and the electric generator and/or the electric motor.

The second flowpath may circumscribe the electric generator and/or the electric motor.

The powerplant may also include a bypass flowpath within the engine housing. The bypass flowpath may circumscribe the engine assembly, the electric generator and the electric motor.

The core turbine section may include a core turbine rotor. A rotational axis of the core turbine rotor may be angularly offset from a rotational axis of the power turbine rotor by an acute angle.

The propulsor rotor may be configured as or otherwise include a ducted rotor.

The propulsor rotor may be configured as or otherwise include an open rotor.

The core turbine section may include a core turbine rotor. A rotational axis of the core turbine rotor may be non-coaxial with the axis.

The core turbine section may include a core turbine rotor. A rotational axis of the core turbine rotor may be non-parallel with the axis.

The powerplant may also include a nacelle housing the engine core, the power turbine section, the electric generator and the electric motor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
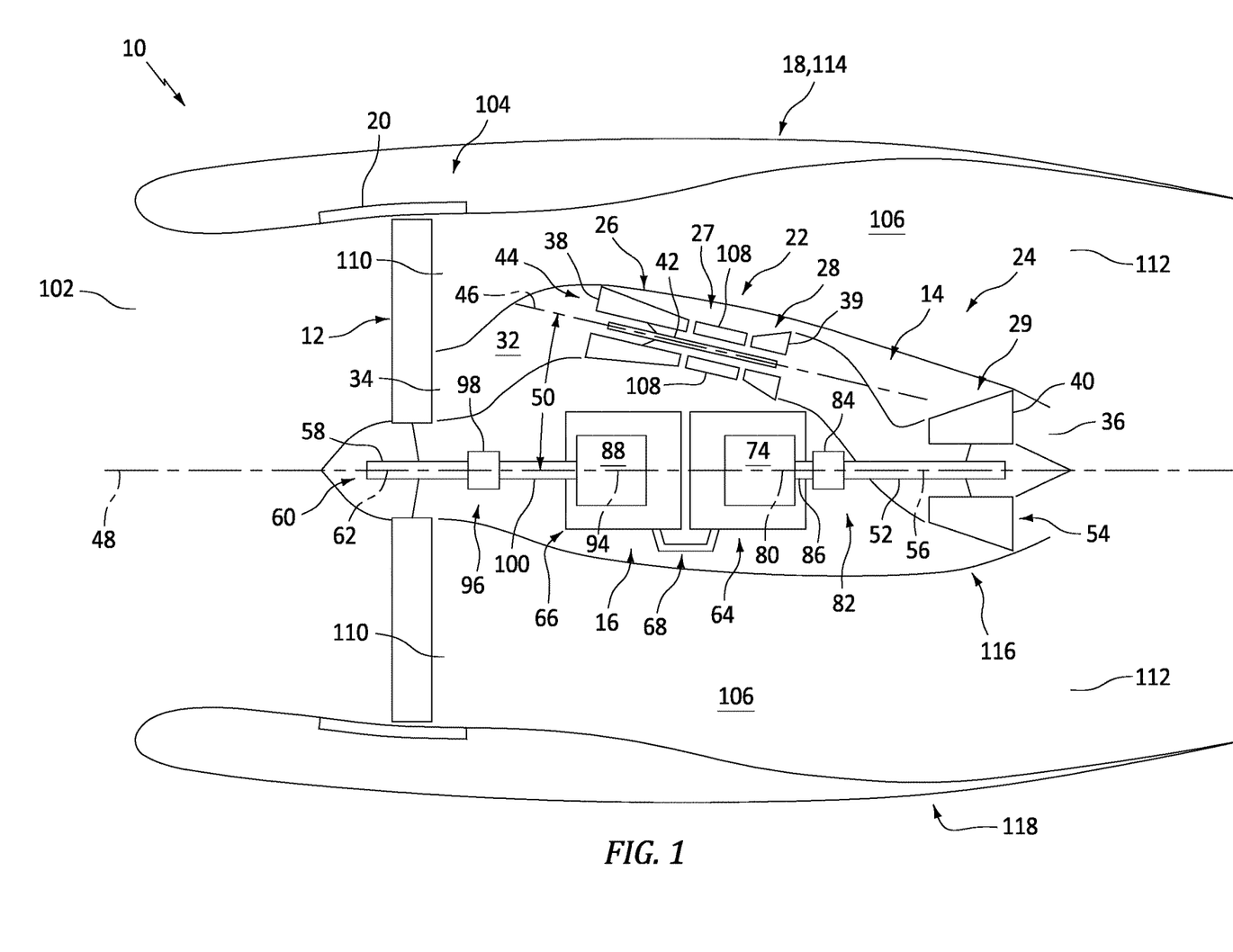
FIG. 1 is a schematic illustration of an aircraft powerplant.

FIG. 1 illustrates a powerplant 10 for an aircraft. The aircraft may be an airplane, a helicopter, a drone (e.g., an unmanned aerial vehicle (UAV)) or any other manned or unmanned aerial vehicle or system. The aircraft powerplant 10 may be configured as, or may otherwise be part of, a propulsion system for the aircraft. This aircraft powerplant 10 of FIG. 1, for example, includes a bladed propulsor rotor 12, a gas turbine engine assembly 14, an electric powertrain 16 and an engine housing 18.

The propulsor rotor 12 is an air mover configured to propel air to generate, for example, aircraft thrust and/or aircraft lift. The propulsor rotor 12 includes a rotor base (e.g., a disk or a hub) and a plurality of propulsor rotor blades (e.g., airfoils, vanes, etc.) arranged circumferentially about and connected to the rotor base. The propulsor rotor 12 may be a ducted propulsor rotor or an open (e.g., un-ducted) propulsor rotor. An example of the ducted propulsor rotor is a fan rotor for a turbofan propulsion system. Examples of the open propulsor rotor include a propeller rotor for a turboprop propulsion system, a propfan rotor for a propfan propulsion system, a pusher fan rotor for a pusher fan propulsion system, and a rotorcraft rotor (e.g., a main helicopter rotor) for a turboshaft propulsion system. However, for ease of description, the propulsor rotor 12 and the aircraft propulsion system are respectively generally described below as the fan rotor and the turbofan propulsion system. With this arrangement, the propulsor rotor 12 may be housed within an engine case 20 (e.g., a fan case, a containment case) of the engine housing 18.

The engine assembly 14 is housed within the engine housing 18. The engine assembly 14 includes a core 22 of a gas turbine engine 24. This engine core 22 includes a core compressor section 26, a core combustor section 27 and a core turbine section 28. The engine assembly 14 also includes a power turbine (PT) section 29 and a core flowpath 32. The core flowpath 32 extends sequentially through the core compressor section 26, the core combustor section 27, the core turbine section 28 and the PT section 29 from an airflow inlet 34 into the core flowpath 32 to a combustion products exhaust 36 from the core flowpath 32. With this arrangement, the core turbine section 28 of FIG. 1 is configured as a high pressure turbine (HPT) section of the turbine engine 24 and the PT section 29 of FIG. 1 is configured as a low pressure turbine (LPT) section of the turbine engine 24.

The core compressor section 26 includes a bladed core compressor rotor 38. The core turbine section 28 includes a bladed core turbine rotor 39. The PT section 29 includes a bladed power turbine (PT) rotor 40. Each of these engine rotors 38-40 includes a rotor base (e.g., one or more disks and/or hubs) and one or more arrays (e.g., stages) of rotor blades (e.g., airfoils and/or vanes). The rotor blades in each array are arranged circumferentially about and are connected to the respective rotor base. Each rotor blade, for example, may be formed integral with or mechanically fastened, welded, brazed and/or otherwise attached to the respective rotor base.

Within the engine core 22, the turbine rotor 39 is configured to mechanically drive rotation of the compressor rotor 38. The turbine rotor 39 of FIG. 1, for example, is connected to the compressor rotor 38 through a core shaft 42; e.g., a high speed engine shaft. At least (or only) the compressor rotor 38, the turbine rotor 39 and the core shaft 42 may collectively form a core rotating assembly 44 of the turbine engine 24; e.g., a high speed spool. This core rotating assembly 44 and its members 38, 39 and 42 are rotatable about a core axis 46; e.g., a rotational axis of the core rotating assembly 44. This core axis 46 may also be a centerline axis of the core rotating assembly 44 and its members 38, 39 and 42 and, more generally, a centerline axis of the engine core 22.

In the illustrative example of FIG. 1, the core rotating assembly 44 and its core axis 46 are offset from a centerline axis 48 of the aircraft powerplant 10. The core rotating assembly 44 and its core axis 46 of FIG. 1, for example, are angularly offset from/non-parallel with the powerplant axis 48. In particular, the core axis 46 is angularly offset from the powerplant axis 48 by an included angle 50; e.g., a non-zero acute angle. This included angle 50 may be greater than zero degrees (0°) and less than sixty degrees (60°); e.g., between twenty degrees (20°) and forty degrees (40°). The present disclosure, however, is not limited to such an exemplary relationship, nor to such a canted core axis arrangement. For example, it is contemplated the core axis 46 may alternatively be parallel with the powerplant axis 48, but laterally offset (e.g., spaced) from the powerplant axis 48.

The PT rotor 40 is connected to a power turbine (PT) shaft 52; e.g., a low speed engine shaft. At least (or only) the PT rotor 40 and the PT shaft 52 may collectively form a power turbine (PT) rotating assembly 54 of the turbine engine 24; e.g., a low speed spool. This PT rotating assembly 54 and its members 40 and 52 are rotatable about a power turbine (PT) axis 56; e.g., a rotational axis of the PT rotating assembly 54. This PT axis 56 may also be a centerline axis of the PT rotating assembly 54 and its members 40 and 52.

The PT rotating assembly 54 and its PT axis 56 may be parallel with the powerplant axis 48. The PT rotating assembly 54 and its PT axis 56 of FIG. 1, for example, are coaxial with the powerplant axis 48. The PT rotating assembly 54 and its PT axis 56 are thereby angularly offset from the core rotating assembly 44 and its core axis 46 by the included angle 50. The present disclosure, however, is not limited to such an exemplary arrangement. For example, based on packaging needs within the engine housing 18, it is contemplated the PT axis 56 may alternatively be offset (e.g., laterally offset and/or angularly offset) from the powerplant axis 48.

The propulsor rotor 12 is connected to a propulsor shaft 58. At least (or only) the propulsor rotor 12 and the propulsor shaft 58 may collectively form a propulsor rotating assembly 60. This propulsor rotating assembly 60 and its members 12 and 58 are rotatable about a propulsor axis 62; e.g., a rotational axis of the propulsor rotating assembly 60. This propulsor axis 62 may also be a centerline axis of the propulsor rotating assembly 60 and its members 12 and 58.

The propulsor rotating assembly 60 and its propulsor axis 62 may be parallel with the powerplant axis 48. The propulsor rotating assembly 60 and its propulsor axis 62 of FIG. 1, for example, are coaxial with the powerplant axis 48. The propulsor rotating assembly 60 and its propulsor axis 62 are thereby angularly offset from the core rotating assembly 44 and its core axis 46 by the included angle 50. The propulsor rotating assembly 60 and its propulsor axis 62 are also parallel with (e.g., coaxial with) the PT rotating assembly 54 and its PT axis 56. The present disclosure, however, is not limited to such an exemplary arrangement. For example, based on packaging needs within the engine housing 18, it is contemplated the propulsor axis 62 may alternatively be offset (e.g., laterally offset and/or angularly offset) from the powerplant axis 48 and/or the PT axis 56.

The propulsor rotating assembly 60 of FIG. 1 is operatively coupled to the PT rotating assembly 54 through the electric powertrain 16. As described below in further detail, this operative coupling facilitates powering operation of the propulsor rotor 12 using the PT rotor 40 electro-mechanically through the electric powertrain 16. However, the propulsor rotor 12 of FIG. 1 is rotationally mechanically independent of the PT rotor 40. For example, rotation of the propulsor rotor 12 is not mechanically linked (e.g., via a shaft, a geartrain or another mechanical coupling) to rotation of the PT rotor 40. This mechanical decoupling of the propulsor rotating assembly 60 and its propulsor rotor 12 from the PT rotating assembly 54 and its PT rotor 40 may facilitate independent operational optimization of the propulsor rotor 12 and the PT rotor 40. For example, the propulsor rotor 12 and its propulsor blades may be tailored to optimize thrust and associated efficiency, whereas the PT rotor 40 and its turbine blades may be tailored to optimize combustion products expansion and associated efficiency. A ratio between a rotational velocity of the propulsor rotor 12 and a rotational velocity of the PT rotor 40 may also be independent optimized and/or varied during an operating cycle of the aircraft powerplant 10.

Figure 2:
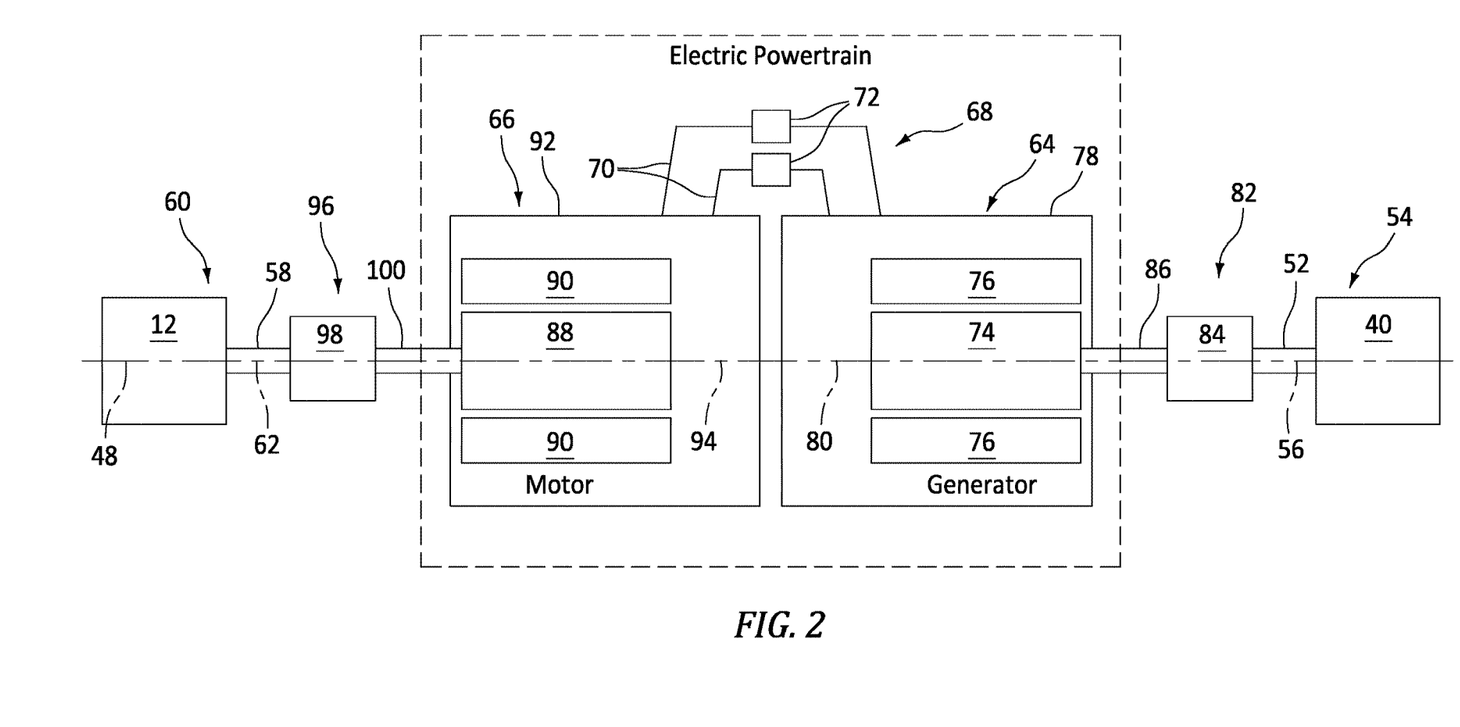
FIG. 2 is a schematic illustration of a portion of the aircraft powerplant with an electric powertrain operatively coupling a power turbine rotor to a propulsor rotor.

The electric powertrain 16 is housed within the engine housing 18. Referring to FIG. 2, the electric powertrain 16 includes an electric generator 64 and an electric motor 66. The electric powertrain 16 also includes an electric power bus 68 electrically coupling the electric generator 64 to the electric motor 66. The power bus 68, for example, may include one or more electric leads 70 (e.g., high voltage lines) extending between and electrically coupled to the electric generator 64 and the electric motor 66. The power bus 68 may also include one or more electrical devices 72 for conditioning, metering, regulating and/or otherwise controlling electric power transfer from the electric generator 64 to the electric motor 66. Examples of the electrical devices 72 include, but are not limited to, switches, current regulators, converters and buffers.

The electric generator 64 may be configured as a superconducting electric generator and/or a high power generator (e.g., a 10-20 megawatt generator). The electric generator 64 of FIG. 2 includes an electric generator rotor 74, an electric generator stator 76 and an electric generator housing 78. The generator rotor 74 is rotatable about a generator axis 80; e.g., a rotational axis of the generator rotor 74. This generator axis 80 may also be a centerline axis of the electric generator 64 and/or its generator rotor 74. The generator stator 76 of FIG. 2 is radially outboard of and circumscribes the generator rotor 74. With this arrangement, the electric generator 64 is configured as a radial flux electric generator. The electric generator 64 of the present disclosure, however, is not limited to such an exemplary rotor-stator configuration nor to radial flux arrangements. The generator rotor 74, for example, may alternatively be radially outboard of and circumscribe the generator stator 76. In another example, the generator rotor 74 may be axially next to the generator stator 76 configuring the electric generator 64 as an axial flux electric generator. Referring again to FIG. 2, the generator rotor 74 and the generator stator 76 are at least partially or completely housed within the generator housing 78.

The generator rotor 74 is operatively coupled to the PT rotating assembly 54 and its PT rotor 40 through a power turbine (PT) drivetrain 82. This PT drivetrain 82 may be configured as a geared drivetrain. The PT drivetrain 82 of FIG. 2, for example, includes the PT shaft 52, a power turbine (PT) geartrain 84 (e.g., a transmission, an epicyclic gear system, etc.) and an electric generator shaft 86. The PT geartrain 84 is arranged between and coupled to the PT shaft 52 and the generator shaft 86, which generator shaft 86 couples the PT geartrain 84 to the generator rotor 74. With this arrangement, the PT rotor 40 and the generator rotor 74 may rotate at different rotational velocities. The PT geartrain 84 may thereby provide a speed change device between the PT rotor 40 and the generator rotor 74. Alternatively, the PT drivetrain 82 may be configured as a direct drive drivetrain. For example, the PT geartrain 84 may be omitted and the PT shaft 52 may be directly coupled to the generator shaft 86. With this arrangement, the PT rotor 40 and the generator rotor 74 may rotate at a common (the same) rotational velocity.

The generator rotor 74 and its generator axis 80 may be parallel with the powerplant axis 48. The generator rotor 74 and its generator axis 80 of FIG. 2, for example, are coaxial with the powerplant axis 48. The generator rotor 74 and its generator axis 80 are thereby angularly offset from the core rotating assembly 44 and its core axis 46; see FIG. 1. The generator rotor 74 and its generator axis 80 are also parallel with (e.g., coaxial with) the PT rotating assembly 54 and its PT axis 56 and/or the propulsor rotating assembly 60 and its propulsor axis 62. The present disclosure, however, is not limited to such an exemplary arrangement. For example, based on packaging needs within the engine housing 18, it is contemplated the generator axis 80 may alternatively be offset (e.g., laterally offset and/or angularly offset) from one or more of the axes 46, 48, 56 and/or 62 (see also FIG. 1).

During operation of the electric generator 64, the electric generator 64 converts mechanical power received from the PT rotating assembly 54 and its PT rotor 40 into electricity. The PT rotating assembly 54 and its PT rotor 40, for example, may drive rotation of the generator rotor 74 through the PT drivetrain 82. The rotation of the generator rotor 74 may generate an electromagnetic field with the generator stator 76, and the generator stator 76 may convert energy from the electromagnetic field into the electricity. The electric generator 64 may then provide this electricity to the electric motor 66 through the power bus 68. It is also contemplated some of the electricity generated by the electric generator 64 may also be provided to one or more other powerplant and/or aircraft components and/or systems. Alternatively, the electric generator 64 may be dedicated to providing (e.g., all) of the generated electricity to the electric motor 66.

The electric motor 66 may be configured as a superconducting electric motor and/or a high power motor (e.g., a 10-20 megawatt motor). The electric motor 66 of FIG. 2 includes an electric motor rotor 88, an electric motor stator 90 and an electric motor housing 92. The motor rotor 88 is rotatable about a motor axis 94; e.g., a rotational axis of the motor rotor 88. This motor axis 94 may also be a centerline axis of the electric motor 66 and/or its motor rotor 88. The motor stator 90 of FIG. 2 is radially outboard of and circumscribes the motor rotor 88. With this arrangement, the electric motor 66 is configured as a radial flux electric motor. The electric motor 66 of the present disclosure, however, is not limited to such an exemplary rotor-stator configuration nor to radial flux arrangements. The motor rotor 88, for example, may alternatively be radially outboard of and circumscribe the motor stator 90. In another example, the motor rotor 88 may be axially next to the motor stator 90 configuring the electric motor 66 as an axial flux electric motor. Referring again to FIG. 2, the motor rotor 88 and the motor stator 90 are at least partially or completely housed within the motor housing 92.

The motor rotor 88 is operatively coupled to the propulsor rotating assembly 60 and its propulsor rotor 12 through a propulsor drivetrain 96. This propulsor drivetrain 96 may be configured as a geared drivetrain. The propulsor drivetrain 96 of FIG. 2, for example, includes the propulsor shaft 58, a propulsor geartrain 98 (e.g., a transmission, an epicyclic gear system, etc.) and an electric motor shaft 100. The propulsor geartrain 98 is arranged between and coupled to the propulsor shaft 58 and the motor shaft 100, which motor shaft 100 couples the propulsor geartrain 98 to the motor rotor 88. With this arrangement, the propulsor rotor 12 and the motor rotor 88 may rotate at different rotational velocities. The propulsor geartrain 98 may thereby provide a speed change device between the propulsor rotor 12 and the motor rotor 88. Alternatively, the propulsor drivetrain 96 may be configured as a direct drive drivetrain. For example, the propulsor geartrain 98 may be omitted and the propulsor shaft 58 may be directly coupled to the motor shaft 100. With this arrangement, the propulsor rotor 12 and the motor rotor 88 may rotate at a common (the same) rotational velocity.

The motor rotor 88 and its motor axis 94 may be parallel with the powerplant axis 48. The motor rotor 88 and its motor axis 94 of FIG. 2, for example, are coaxial with the powerplant axis 48. The motor rotor 88 and its motor axis 94 are thereby angularly offset from the core rotating assembly 44 and its core axis 46; see FIG. 1. The motor rotor 88 and its motor axis 94 are also parallel with (e.g., coaxial with) the generator rotor 74 and its generator axis 80, the PT rotating assembly 54 and its PT axis 56 and/or the propulsor rotating assembly 60 and its propulsor axis 62. The present disclosure, however, is not limited to such an exemplary arrangement. For example, based on packaging needs within the engine housing 18, it is contemplated the motor axis 94 may alternatively be offset (e.g., laterally offset and/or angularly offset) from one or more of the axes 46, 48, 56, 62 and/or 80 (see also FIG. 1).

During operation of the electric motor 66, the electric motor 66 converts electricity received from at least (or only) the electric generator 64 into mechanical power. The motor stator 90, for example, may generate an electromagnetic field with the motor rotor 88 using the electricity. This electromagnetic field may drive rotation of the motor rotor 88. The motor rotor 88 may thereby drive rotation of the propulsor rotor 12 through the propulsor drivetrain 96.

Referring to FIG. 1, the electric motor 66 may neighbor the electric generator 64 within the engine housing 18. The electric motor 66 of FIG. 1, for example, is arranged axially next to (e.g., adjacent, slightly spaced from, abutted against, etc.) the electric generator 64; e.g., within a common compartment of the engine housing 18. The electric motor 66 of FIG. 1 is located axially forward of the electric generator 64 along the powerplant axis 48. By reducing distance between the electric motor 66 and the electric generator 64, the power bus 68 may be shortened and losses associated with directing the electricity across the power bus 68 may be significantly reduced, particularly compared to an arrangement where an electric generator is arranged remote from an electric motor; e.g., outside of an engine housing in an aircraft fuselage.

The engine core 22 and its members 38, 39, 42 and 44 of FIG. 1 are located radially outboard of the electric powertrain 16 and one or more of its members 64 and 66. By locating an entirety of the core rotating assembly 44 to a lateral side (e.g., a radial outer side) of the electric powertrain 16 and its members 64 and 66, an overall axial length of the aircraft powerplant 10 along its powerplant axis 48 may be reduced. With this arrangement, none of the powerplant shafts 52, 58, 86, 100 projects through an internal bore of the core shaft 42. The core rotating assembly 44 of FIG. 1, for example, is not nested with (e.g., any of) the powerplant members 54, 60, 74, 88. This separation of the core rotating assembly 44 from the other powerplant members 54, 60, 74, 88 may facilitate, among other things, sizing the core shaft 42 smaller than one or more of the shafts 52, 58, 86, 100, and/or decreasing a size of the core compressor section 26 and/or the core turbine section 28 to promote greater engine core efficiency.

During operation of the aircraft powerplant 10 of FIG. 1, air enters the aircraft powerplant 10 through an airflow inlet 102. This air is directed through a propulsor section 104 of the aircraft powerplant 10 (longitudinally across the propulsor rotor 12) and into the core flowpath 32 and a bypass flowpath 106. The core flowpath 32 extends sequentially from the core inlet 34, longitudinally across the compressor rotor 38, a combustion chamber (e.g., an annular combustion chamber) within a combustor 108 (e.g., an annular combustor) of the core combustor section 27, the turbine rotor 39 and the PT rotor 40, to the core exhaust 36. The air entering this core flowpath 32 may be referred to as "core air". The bypass flowpath 106 extends through a bypass duct (e.g., an annular duct) from an airflow inlet 110 into the bypass flowpath 106 to an airflow exhaust 112 from the bypass flowpath 106. This bypass flowpath 106 bypasses (e.g., is radially outboard of and extends axially along) the engine core 22 and each of its engine sections 26-28 as well as the PT section 29. The bypass flowpath 106 may also circumscribe one or more of the powerplant members 26-29, 64 and 66. The air entering this bypass flowpath 106 may be referred to as "bypass air". The core inlet 34 and the bypass inlet 110 may each be located at (e.g., on, adjacent or proximate) an aft, downstream end of the propulsor section 104.

The core air is compressed by the compressor rotor 38 and directed into the combustion chamber in the core combustor section 27. Fuel is injected into the combustion chamber and mixed with the compressed core air to provide a fuel-air mixture. This fuel-air mixture is ignited and combustion products thereof flow through and sequentially cause the turbine rotor 39 and the PT rotor 40 to rotate. The rotation of the turbine rotor 39 drives rotation of the compressor rotor 38 and thereby compress the core air received from the core inlet 34. The rotation of the PT rotor 40 drives rotation of the generator rotor 74 through the PT drivetrain 82 and thereby mechanically powers operation of the electric generator 64. The electric generator 64 may generate electricity as described above. This electricity is delivered to the electric motor 66 through the power bus 68 to electrically power operation of the electric motor 66. The electric motor 66 may drive rotation of the propulsor rotor 12 through the propulsor drivetrain 96 as described above. The rotation of the propulsor rotor 12 propels the bypass air through the bypass flowpath 106 and out of the aircraft powerplant 10 through the bypass exhaust 112 to provide aircraft thrust. The propulsion of the bypass air may account for a majority of thrust generated by the aircraft powerplant 10, e.g., more than seventy-five percent (75%) of engine thrust. The aircraft powerplant 10 of the present disclosure, however, is not limited to the foregoing exemplary thrust ratio.

The engine housing 18 may be configured as or otherwise include an aircraft propulsion system nacelle 114. This nacelle 114 is configured to form an aerodynamic cover over internal members of the aircraft powerplant 10. The nacelle 114 is also configured to at least partially form the core flowpath 32 (e.g., upstream of the engine core 22, between the engine core 22 and the PT section 29, and/or downstream of the PT section 29) and/or the bypass flowpath 106. The nacelle 114 of FIG. 1, for example, includes an inner nacelle structure 116 ("inner structure") and an outer nacelle structure 118 ("outer structure"). The inner structure 116 houses one or more of the powerplant members 16, 22 and 29. This inner structure 116 also forms an inner peripheral boundary of the bypass flowpath 106 within the engine housing 18. The outer structure 118 houses the propulsor rotor 12 and the engine case 20. This outer structure 118 is spaced radially outboard from the inner structure 116. The outer structure 118 also extends circumferentially about (e.g., circumscribes) and axially overlaps the inner structure 116. The outer structure 118 thereby forms an outer peripheral boundary of the bypass flowpath 106 within the engine housing 18. The present disclosure, however, is not limited to such an exemplary arrangement. For example, the engine housing 18 may omit the outer structure 118 where, for example, the propulsor rotor 12 is configured as the open rotor.

Figure 3:
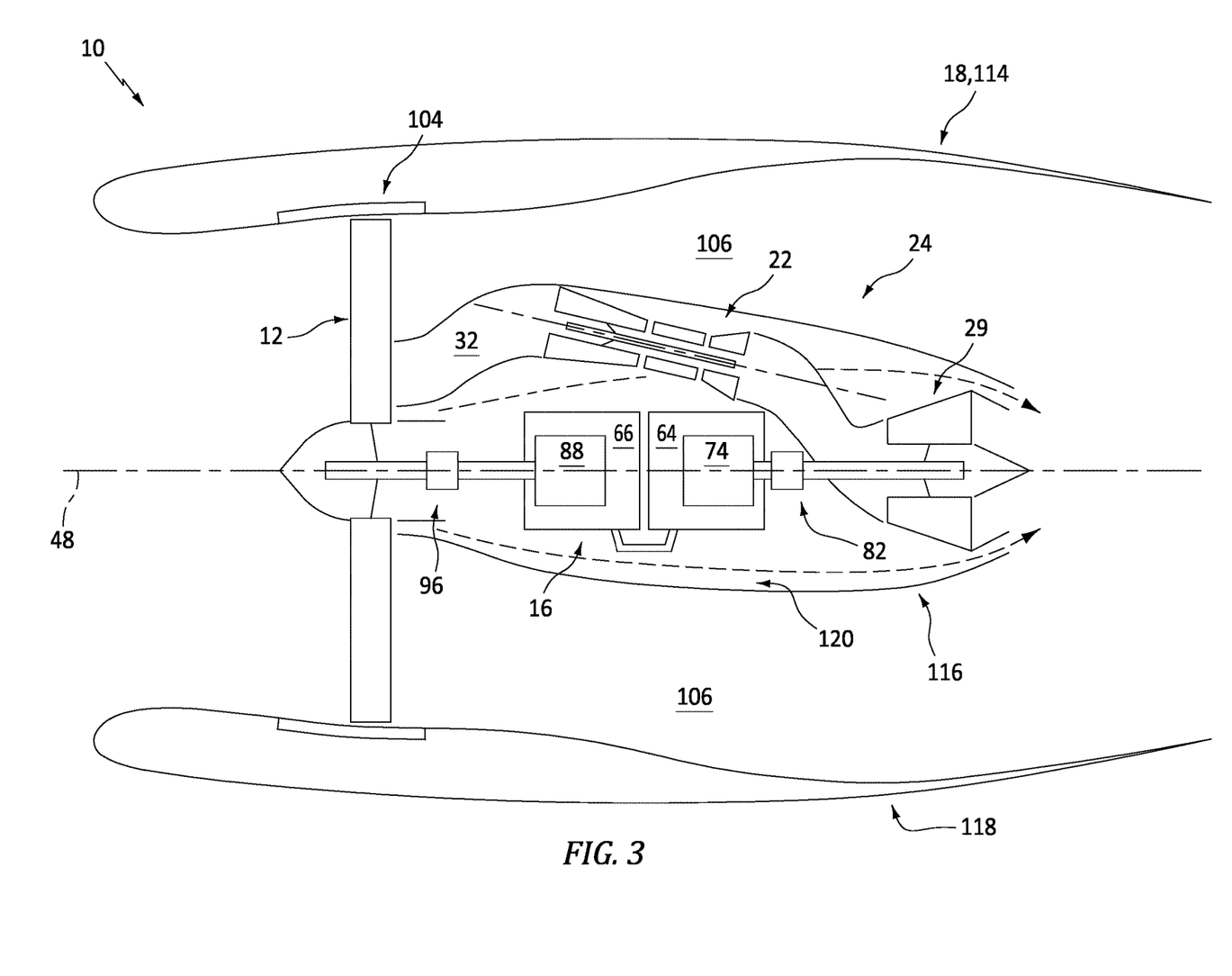
FIG. 3 is a schematic illustration of the aircraft powerplant with another internal flowpath.

In some embodiments, referring to FIG. 3, the powerplant may include an additional flowpath 120 (e.g., an annular flowpath or a non-annular flowpath) for cooling the electric powertrain 16. This cooling flowpath 120 of FIG. 3 is disposed in the inner structure 116, and extends along the electric powertrain 16. The cooling flowpath 120 may be disposed radially between the electric powertrain 16 and the engine core 22. The cooling flowpath 120 may extend circumferentially about (e.g., completely around) the electric powertrain 16 and its member(s) 64 and/or 66. The cooling flowpath 120 may bleed (or otherwise direct) air propelled by the propulsor rotor 12 along the electric motor 66 and/or the electric generator 64 to convectively cool the electric powertrain member(s) 64 and/or 66.

In some embodiments, the aircraft powerplant 10 may include a steam injection system. This steam injection system may introduce steam into the core flowpath 32 within the engine core 22; e.g., in the combustor 108. The steam injection system may also recover water from the combustion products flowing within the core flowpath 32; e.g., downstream of the PT section 29. This recovered water may then be vaporized to provide the steam. Utilizing this steam injection system, the engine core size may be reduced while maintaining efficiency.

The aircraft powerplant 10 is described above with an exemplary single rotating assembly engine core; e.g., a single spool engine core. The engine core 22, however, may alternatively include multiple core rotating assembly. The core compressor section 26, for example, may be divided into a low pressure compressor (LPC) section and a high pressure compressor (HPC) section. Similarly, the core turbine section 28 may be divided into a low pressure turbine (LPT) section and a high pressure turbine (HPT) section. The present disclosure therefore is not limited to any particular engine core configuration.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:
an engine housing, the engine housing comprising a nacelle;
an engine assembly arranged in the engine housing, the engine assembly including a core flowpath, a core compressor section, a core combustor section, a core turbine section and a power turbine section, the core flowpath extending through the core compressor section, the core combustor section, the core turbine section and the power turbine section from an inlet into the core flowpath to an exhaust from the core flowpath, and the power turbine section comprising a power turbine rotor;
an electric powertrain, the electric powertrain comprising an electric generator and an electric motor,
the electric generator arranged in the engine housing, the electric generator comprising a generator rotor, and the power turbine rotor configured to drive rotation of the generator rotor;
the electric motor arranged in the engine housing, the electric motor comprising a motor rotor, and the electric generator configured to power operation of the electric motor; and
a propulsor rotor, the propulsor rotor rotatable about an axis, and the motor rotor configured to drive rotation of the propulsor rotor;
wherein
the engine assembly further includes an engine core located to a side of and axially overlapping at least one of the electric generator or the electric motor;
the engine core includes the core compressor section, the core combustor section and the core turbine section;
the nacelle houses the engine assembly, the electric generator and the electric motor, and
the electric generator and the electric motor are mechanically independent, such that the propulsor rotor is rotationally mechanically independent of the power turbine rotor.

2. The powerplant of claim 1, wherein the nacelle further houses the propulsor rotor.

3. The powerplant of claim 1, further comprising a geartrain arranged between and operatively coupling the power turbine rotor to the generator rotor.

4. The powerplant of claim 1, wherein the motor rotor is coaxial with the generator rotor.

5. The powerplant of claim 1, wherein
the propulsor rotor is rotatable about an axis; and
the electric motor is axially adjacent the electric generator along the axis.

6. The powerplant of claim 1, wherein at least one of
the electric generator is configured as a superconducting electric generator; or
the electric motor is configured as a superconducting electric motor.

7. The powerplant of claim 1, further comprising:
a cooling flowpath within the engine housing;

the cooling flowpath disposed radially between the engine core and the electric powertrain.

8. The powerplant of claim 7, wherein the cooling flowpath circumscribes at least one of the electric generator or the electric motor.

9. The powerplant of claim 7, further comprising:
a bypass flowpath within the engine housing;
the bypass flowpath circumscribing the engine assembly, the electric generator and the electric motor.

10. The powerplant of claim 7, wherein the cooling flowpath extends circumferentially around the electric powertrain.

11. The powerplant of claim 1, wherein
the core turbine section comprises a core turbine rotor; and
a rotational axis of the core turbine rotor is angularly offset from a rotational axis of the power turbine rotor by an acute angle.

12. The powerplant of claim 1, wherein the propulsor rotor comprises a ducted rotor.

13. A powerplant for an aircraft, comprising:
an engine core including a core compressor section, a core combustor section and a core turbine section;
a power turbine section comprising a power turbine rotor;
a core flowpath extending through the core compressor section, the core combustor section, the core turbine section and the power turbine section from an inlet into the core flowpath to an exhaust from the core flowpath;
an electric generator comprising a generator rotor, the generator rotor mechanically coupled to the power turbine rotor;
an electric motor electrically coupled to the electric generator, the electric motor comprising a motor rotor, and the engine core axially overlapping the electric generator and the electric motor; and
a propulsor rotor rotatable about an axis and mechanically coupled to the motor rotor; wherein:
the engine core is located to a side of and axially overlaps at least one of the electric generator or the electric motor; and
the electric generator and the electric motor are mechanically independent, such that rotation of the propulsor rotor is not mechanically linked to rotation of the power turbine rotor.

14. The powerplant of claim 13, wherein
the core turbine section comprises a core turbine rotor; and
a rotational axis of the core turbine rotor is non-coaxial with the axis.

15. A powerplant for an aircraft, comprising:
an engine core including a core compressor section, a core combustor section and a core turbine section;
a power turbine section comprising a power turbine rotor;
a core flowpath extending through the core compressor section, the core combustor section, the core turbine section and the power turbine section from an inlet into the core flowpath to an exhaust from the core flowpath;
an electric powertrain, the electric powertrain comprising an electric generator and an electric motor,
the electric generator comprising a generator rotor, the generator rotor mechanically coupled to the power turbine rotor;
the electric motor located next to and electrically coupled with the electric generator, the electric motor comprising a motor rotor;
a propulsor rotor rotatable about an axis and mechanically coupled to the motor rotor; and
a cooling flowpath for cooling the electric powertrain; wherein:
the engine core is located to a side of and axially overlaps at least one of the electric generator or the electric motor;
the cooling flowpath is disposed radially between the electric powertrain and the engine core, and extends circumferentially around the electric powertrain; and
the electric generator and the electric motor are mechanically independent, such that the propulsor rotor is rotationally mechanically independent of the power turbine rotor.

16. The powerplant of claim 15, wherein the propulsor rotor is not mechanically linked to the power turbine rotor through a geartrain.

17. The powerplant of claim 13, further comprising a nacelle housing the engine core, the power turbine section, the electric generator and the electric motor.

* * * * *